(12) United States Patent
Nair et al.

(10) Patent No.: US 10,606,289 B2
(45) Date of Patent: Mar. 31, 2020

(54) SYSTEM AND APPROACH FOR VALIDATING CONDITIONS OF A SPACE

(71) Applicant: Honeywell International Inc., Morristown, NJ (US)

(72) Inventors: Ajay N. Nair, Bangalore (IN); Liwen Yu, Acton, MA (US); Upender Paravastu, Bangalore (IN); Wei Hua, Acton, MA (US); Mohamed Kasim Nizamudeen, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 969 days.

(21) Appl. No.: 14/836,824

(22) Filed: Aug. 26, 2015

(65) Prior Publication Data

US 2017/0059191 A1    Mar. 2, 2017

(51) Int. Cl.
| | |
|---|---|
| G05B 21/00 | (2006.01) |
| G01M 1/38 | (2006.01) |
| G05B 13/00 | (2006.01) |
| G05B 15/00 | (2006.01) |
| G05D 23/00 | (2006.01) |
| G05D 23/19 | (2006.01) |
| F24F 11/62 | (2018.01) |
| F24F 11/30 | (2018.01) |

(52) U.S. Cl.
CPC ......... *G05D 23/1917* (2013.01); *F24F 11/30* (2018.01); *F24F 11/62* (2018.01)

(58) Field of Classification Search
CPC .... F24F 11/006; G05B 15/02; H04L 12/2803; H04L 67/02
See application file for complete search history.

(56) References Cited

U.S. PATENT DOCUMENTS

| | | | |
|---|---|---|---|
| 6,230,080 B1* | 5/2001 | Lee | G01N 1/24 700/275 |
| 8,239,922 B2* | 8/2012 | Sullivan | F24F 11/0009 236/51 |
| 2008/0084895 A1* | 4/2008 | Lee | G05B 19/4185 370/466 |
| 2008/0277486 A1* | 11/2008 | Seem | H04L 67/125 236/49.3 |

(Continued)

OTHER PUBLICATIONS

Phoenix Controls Corporation, "Lab Verification Tool User's Guide," 36 pages, Apr. 2008.*

*Primary Examiner* — Zhipeng Wang

(74) *Attorney, Agent, or Firm* — Seager, Tufte & Wickhem LLP

(57) ABSTRACT

A system and approach for verifying and validating a room condition and its behavior in a critical environment. The system and approach may be a room controller built on top of a Niagara™ framework or launched from a Niagara workbench, and leverages extensible of Niagara. The system and approach may be web-based and used to test and verify the room condition per preset conditions. The system may have steps or tabs. They may incorporate screens for a create/open task, select test zone, read flow, hood/booster, T-stat set-up or temperature lever set-up, visual checks, and a report. One may create a new task and edit any existing task on the controller. One may move from task to task in either direction or go directly to the report of a completed task.

20 Claims, 16 Drawing Sheets

(56) References Cited

U.S. PATENT DOCUMENTS

| | | | |
|---|---|---|---|
| 2010/0305718 A1* | 12/2010 | Clark | G05B 15/02 |
| | | | 700/17 |
| 2011/0093493 A1 | 4/2011 | Nair et al. | |
| 2011/0153033 A1* | 6/2011 | Walter | G05B 15/02 |
| | | | 700/16 |
| 2013/0158714 A1* | 6/2013 | Barton | F24F 11/30 |
| | | | 700/276 |
| 2013/0324026 A1* | 12/2013 | Fiorita, Jr. | F24F 3/161 |
| | | | 454/187 |
| 2014/0018940 A1* | 1/2014 | Casilli | G05B 15/02 |
| | | | 700/29 |
| 2015/0056909 A1* | 2/2015 | Chien | F24F 11/30 |
| | | | 454/187 |
| 2016/0010883 A1* | 1/2016 | Jornitz | E03C 1/02 |
| | | | 454/187 |
| 2016/0161523 A1* | 6/2016 | Li | G01P 5/001 |
| | | | 73/28.01 |

* cited by examiner

FIG. 4

LAB VERIFICATION — 42

Tabs: LAB VERIFICATION — 60 | Create/Open Task — 61 | Select Test Zone — 62 | Read Flows — 63 | Hood/Booster — 64 | T-stat Setup — 65 | Visual — 66 | Report — 67

NEW TASK

- Task Name: cyber
- Field Service Engineer: test
- Date: 12/04 03:19:56 pm

EXISTING TASK

Select task and click Next to modify

| Select Task | Task Name | Status | Zone selected for test |
|---|---|---|---|
|  | cyber | Complete | POC_Advanced |

ADMIN | 11:13 AM | December 8

Previous | Next

FIG. 5

| | | | | | | |
|---|---|---|---|---|---|---|
| LAB VERIFICATION | Create/Open Task | Select Test Zone | Read Flows | T-stat Setup | Hood/Booster | Visual | Report |

SELECT ZONE
- LonNetwork1
  - □ LabFul_GLEX_3Hood_Office
- LonNetwork2
  - □ LabFul_GLEX_3Hood_Office
  - ☑ PDC_Advanced
  - □ SCCZoneVaV(MAV)

Lab101_Controller

| Device Name | Online Status | Control Function |
|---|---|---|
| Gex_Main | Unknown | 7R F O |
| POC(CFX) | Unknown | T. |
| Stdstone(Supply) | Unknown | T. |
| MevA1c | Unknown | I. |
| Stdalone(Labeust) | Unknown | |

Previous    Next

LAB VERIFICATION — 46

Tabs: LAB VERIFICATION | Create/Open Task | Select Test Zone | Read Flows (63) | Hood/Booster (64) | T-stat Setup | Visual | Report ADMIN | 11:13 AM | December 22

Enter the minimum hood flow(s)

LabController203 – LabFull_GEX_4Hood_AdvTemp — 95

| Device Name | Function | Minimum | Maximum |
|---|---|---|---|
| RedHood1 | Hood | 48 L/S | 661 L/S |
| Hood 2 | Hood | 48 L/S | 708 L/S |
| Hood 3 | Hood | 95 L/S | 1180 L/S |
| Hood 4 | Hood | 43 L/S | 708 L/S |
| MAV Booster 1 | Booster | 95 L/S | 1180 L/S |
| MAV Booster 2 | Booster | 43 L/S | 708 L/S |

Previous | Next

FIG. 10

| Device Name | Function | Minimum | Maximum |
|---|---|---|---|
| RedHood1 | Hood | 48 L/S | 661 L/S |
| Hood 2 | Hood | | L/S |
| Hood 3 | Hood | | L/S |
| Hood 4 | Booster | | L/S |
| MAV Booster 1 | Booster | | L/S |
| MAV Booster 2 | | | |

Confirm: Hood Min value should be less than 661

FIG. 11

Lab Verification Applicati... x 199.63.214.11/ord?module://pcRmctrl/LabVerifApp/com/pc/rmctrl/labverif/ui/html/RmctrlLVTPage.hyml#tab/tab-5

LAB VERIFICATION — 47

ADMIN | 11:13 AM | December 22

| LAB VERIFICATION | Create/Open Task | Select Test Zone | Read Flows | Hood/Booster | T-stat Setup — 65 | Visual | Report |

Click on the column header to read temperature lever min(cool) and max(warm)

LabController203 – LabFull_GEX_4Hood_AdvTemp

| Device Name | Setpoint Lever Min | Setpoint Lever Max | Unit |
|---|---|---|---|
| MAV_ATC | ?? | ?? | DegC |

99 →

Previous    Next

FIG. 13

LAB VERIFICATION — 48

| LAB VERIFICATION | Create/Open Task | Select Test Zone | Read Flows | Hood/Booster | T-stat Setup | Visual | Report |

66

GENERAL VERIFICATIONS — 103

|  | | N/A |
|---|---|---|
| Reheat valve verified: | ☑ | ☐ |
| Stream valve verified: | ☑ | ☐ |
| Occ/Unocc state verified: | ☑ | ☐ |
| Bypass state verified: | ☑ | ☐ |
| Emergency mode verified: | ☑ | ☐ |
| Fumehood monitor calibration: | ☑ | ☐ |

ZONE CONFIGURATIONS

| Device Name | OccMinVentSe1P1 | UnoccMinVentSeP1 | Cooling Min | Cooling Max |
|---|---|---|---|---|
| GEX (SocLabFull) | 2000 CFM | 2000 CFM | 500 CFM | 1000 CFM |

104

HOOD VISUAL CHECKS

| | Hood 1 | Hood 2 | Hood 3 | Hood 4 |
|---|---|---|---|---|
| | Validation Complete | Validation Complete | Validation Complete | Validation Complete |
| Local Flow Alarm | ☐ | ☐ | ☐ | ☐ |
| Emergency Exhaust Function | ☐ | ☐ | ☐ | ☐ |

105

Previous | Next

ADMIN | 11:13 AM | December 22

FIG. 14

(rotated page - landscape figure)

Lab Verification Applicati... x
199.63.214.11/ord?module://pcRmctrlLabVerifApp/com/pc/rmctrl/labverif/ui/html/RmctrlLVTPage.hyml#tab/tab-7

LAB VERIFICATION

49

ADMIN    11:13 AM | December 22

| LAB VERIFICATION | Create/Open Task | Select Test Zone | Read Flows | Hood/Booster | T-stat Setup | Visual | Report |

67

LabController203 – LabFull_GEX_4Hood_AdvTemp

106

Task Name: Task101
Field Service Engineer: NMK
Date: 12/22 04:47:31 pm
Selected Room: LabFull_GEX_4Hood_AdvTemp
Notes (max of 1000 characters): Verified by NMK Save — 109
Export — 108

Previous    Next
Show All Downloads
110

| | A | B | C | D | E | F |
|---|---|---|---|---|---|---|
| 35 | | | | | | |
| 36 | | HOOD 1 | HOOD 2 | HOOD 3 | HOOD 4 | |
| 37 | Local Flow Alarm: | Y | Y | Y | Y | |
| 38 | Emergency Exhaust Function: | Y | Y | Y | Y | |
| 39 | Sash Height Alarm Operation: | N | N | N | N | |
| 40 | Sash Height Alarm Operation: | -- | -- | -- | -- | |
| 41 | Mute Function: | Y | Y | Y | Y | |
| 42 | Energy Waste Alarm Function: | N | N | N | N | |
| 43 | Hibernation Mode: | N | N | N | N | |
| 44 | Standby Operation: | N | N | N | N | |
| 45 | Face Velocity Readout: | Y | Y | Y | Y | |
| 46 | CFM Readout: | Y | Y | Y | Y | |
| 47 | CFM/Volt: | 200 CFM/Volt | 200 CFM/V | 200 CFM/V | 200 CFM/Volt | |
| 48 | Monitor Label Complete: | Y | Y | Y | Y | |
| 49 | Two-State Switch Operation | Y | Y | Y | Y | |
| 50 | | | | | | |
| 51 | | | GEX (SccLabFull) | | | |
| 52 | | OccMinVentSetPt | 944 | | | |
| 53 | | UnOccMinVentSet | 944 | | | |
| 54 | Thermal Zone 1 | Cooling Flow Min | 236 | | | |
| 55 | | Cooling Flow Max | 472 | | | |
| 56 | | | | | | |
| 57 | Notes: | | | | | |
| 58 | Verified by NMK | | | | | |
| 59 | | | | | | |

US 10,606,289 B2

SYSTEM AND APPROACH FOR VALIDATING CONDITIONS OF A SPACE

BACKGROUND

The present disclosure pertains to spaces and particularly pertains to clean or laboratory spaces or rooms.

SUMMARY

The disclosure reveals a system and approach for verifying and validating a room condition and its behavior in a critical environment. The system and approach may be a room controller built on top of a Niagara™ framework or launched from a Niagara workbench, and leverages extensible of Niagara. The system and approach may be web-based and used to test and verify the room condition per preset conditions. The system may have steps or tabs. They may incorporate screens for a create/open task, select test zone, read flow, hood/booster, T-stat set-up or temperature lever set-up, visual checks, and a report. One may create a new task and edit any existing task on the controller. One may move from task to task in either direction or go directly to the report of a completed task.

BRIEF DESCRIPTION OF THE DRAWING

FIG. 4 is a diagram of a create/open task layout;

FIG. 5 is a diagram of a select test zone;

FIG. 7 is a diagram of a dialog box situated on the layout of FIG. 6;

FIG. 8 is a diagram of the read flow layout with data on cooling demand for some hoods and boosters of a selected space;

FIG. 9 is a diagram indicating some minimum and maximum flow values for hoods and boosters;

FIG. 10 is a diagram of a dialog box situated on a layout like that of FIG. 9 but indicating a specific minimum flow value for a hood;

FIG. 11 is a diagram of a T-stat or temperature lever setup;

FIG. 13 is a diagram for visual checks relative to various components in a room;

FIG. 14 is a diagram for report generation; and

FIG. 15 and FIG. 16 are diagrams of an example report.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Figure 1:
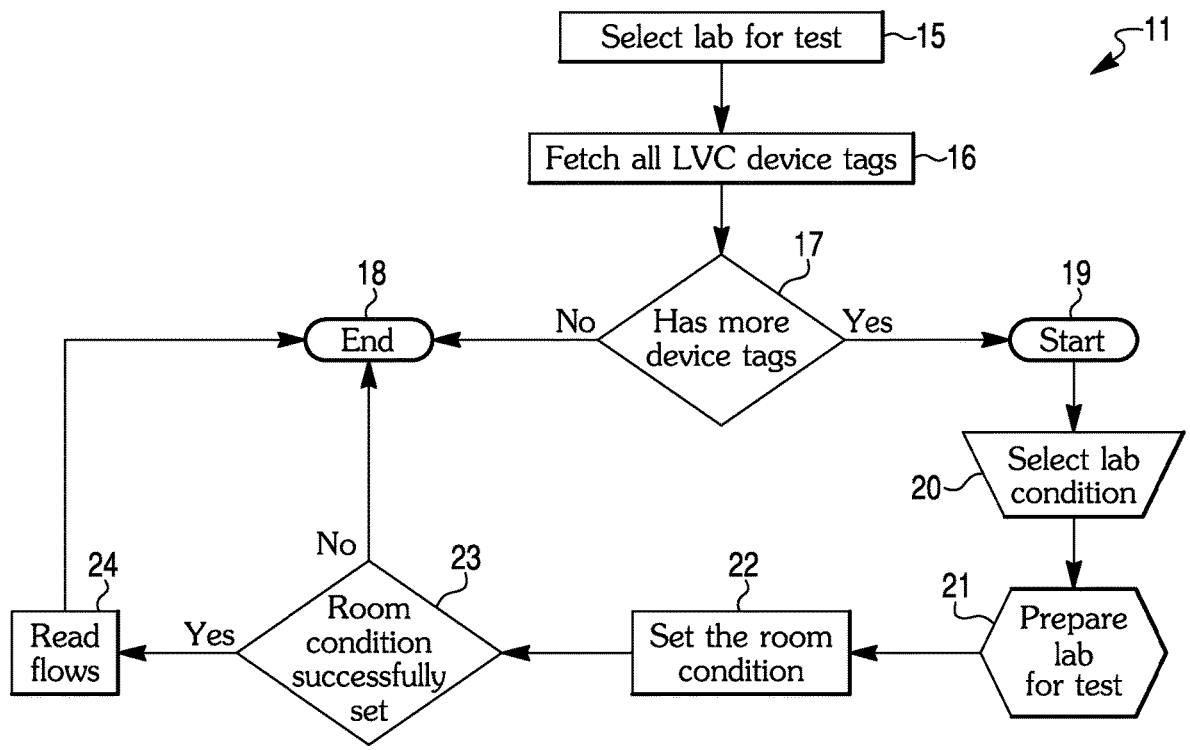
FIG. 1 is a diagram of an example flow chart for the present system and approach at a lab level.

FIG. 1 is a diagram of a flow chart 11 that shows a high level operations that happen in a lab when read flows action is performed at level for laboratory (lab), clean room, space, or the like. A lab may be selected for a test at symbol 15. All of the LVC device tags may be fetched at symbol 16. At symbol 17, a question of whether there are more tags may be asked. If an answer is no, then the procedure may end at symbol 18. If the answer is yes, then a flow may start at symbol 19. A lab condition may be selected at symbol 20. The lab may be prepared for a test at symbol 21. At symbol 22, a room condition may be set. Whether the room condition is successfully set may be determined at symbol 23. If the room condition is not successfully set, then the procedure ends at symbol 18. If the room condition is successfully set, then flows may be read at symbol 24. After the flows are read, the procedure may end at symbol 24.

Figure 2:
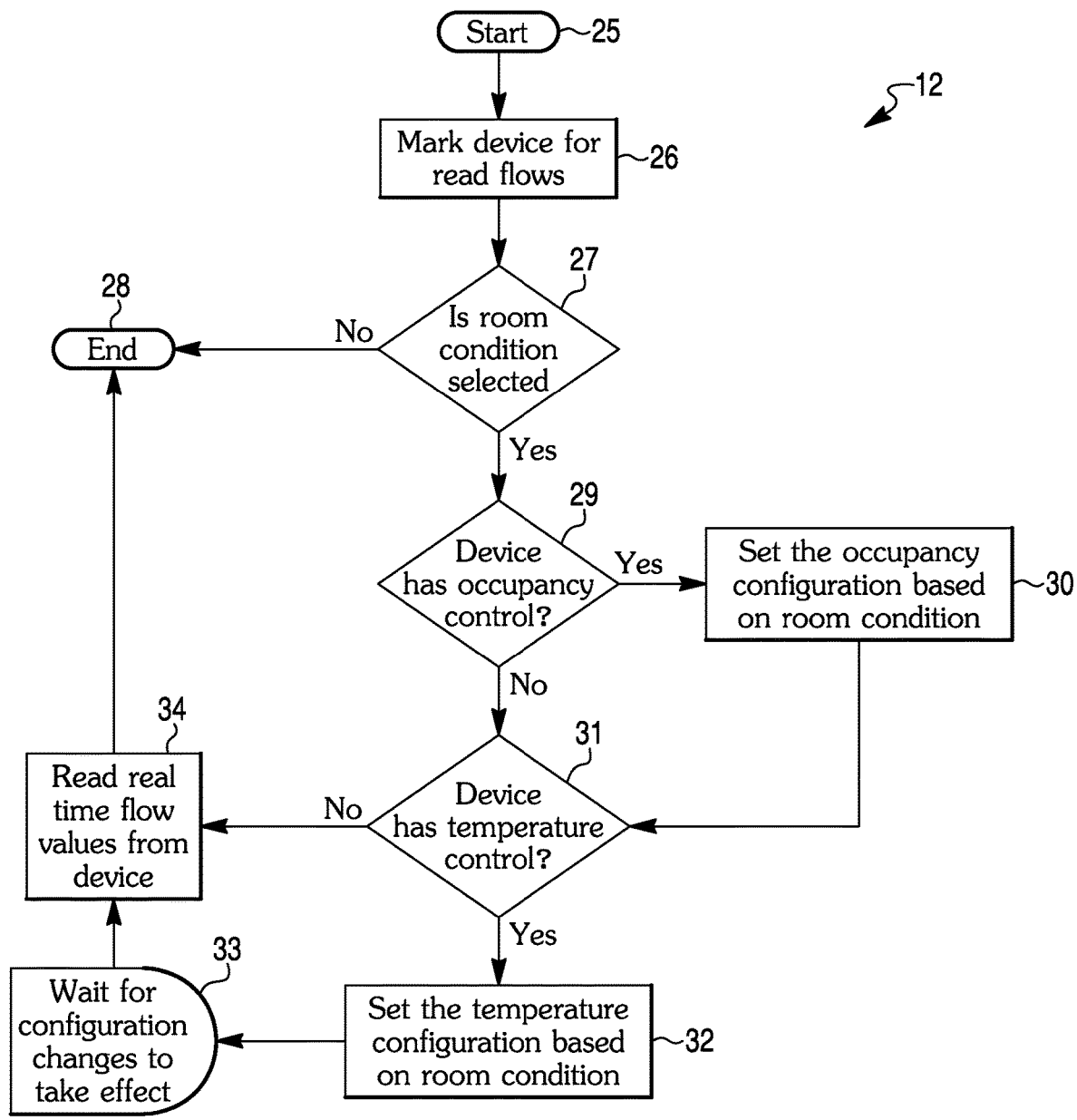
FIG. 2 is a diagram of an example flow chart for the present system and approach at a device level.

FIG. 2 is a diagram of a flow chart 12 that depicts operations that happen at device (LVC) level when a read flow action is performed. From a start at a symbol 25, a device may be marked for reading flows at symbol 26. A question of whether a room condition is selected may be asked at symbol 27. If an answer is no, then the procedure may end at symbol 28. If the answer is yes, then a question of whether the device has an occupancy control may be asked at symbol 29. If an answer is yes, then an occupancy configuration based on room condition may be set at a symbol 30. Afterwards, at a symbol 31, a question of whether the device has a temperature control may be asked. If the answer to the question at symbol 29 is no, then again the question of whether the device has a temperature control is asked at symbol 31. If an answer is yes, then a temperature configuration based on a room condition may be set at symbol 32. At symbol 33, there may be a wait for configuration changes to take effect. Then at symbol 34, real time flow values may be read from the device. Upon completion of reading the flow values, the procedure may end at symbol 28. If the answer to the question at symbol 31 is no, then the real time flow values may be read from the device at symbol 34 and afterwards the procedure may end at symbol 28.

The salient features of a Niagara™ based lab verification tool may be incorporated as noted in the following. The tool may be completely browser based and thus the user can perform lab verification. The verified lab task may be accessed by logging in to the lab verification tool.

A purpose may be to provide a web based lab verification tool which can leverage the Niagara's extensible features. The LVT, as a web based tool, may be used by a rep to test and verify if the room conditions and the tool behavior are working per designed conditions. An LVT user or rep may be able to drive the room in a full heating condition, a full cooling condition and various other conditions. The LVT user at the end may also generate a report which can be exported on to the local system.

Figure 3:
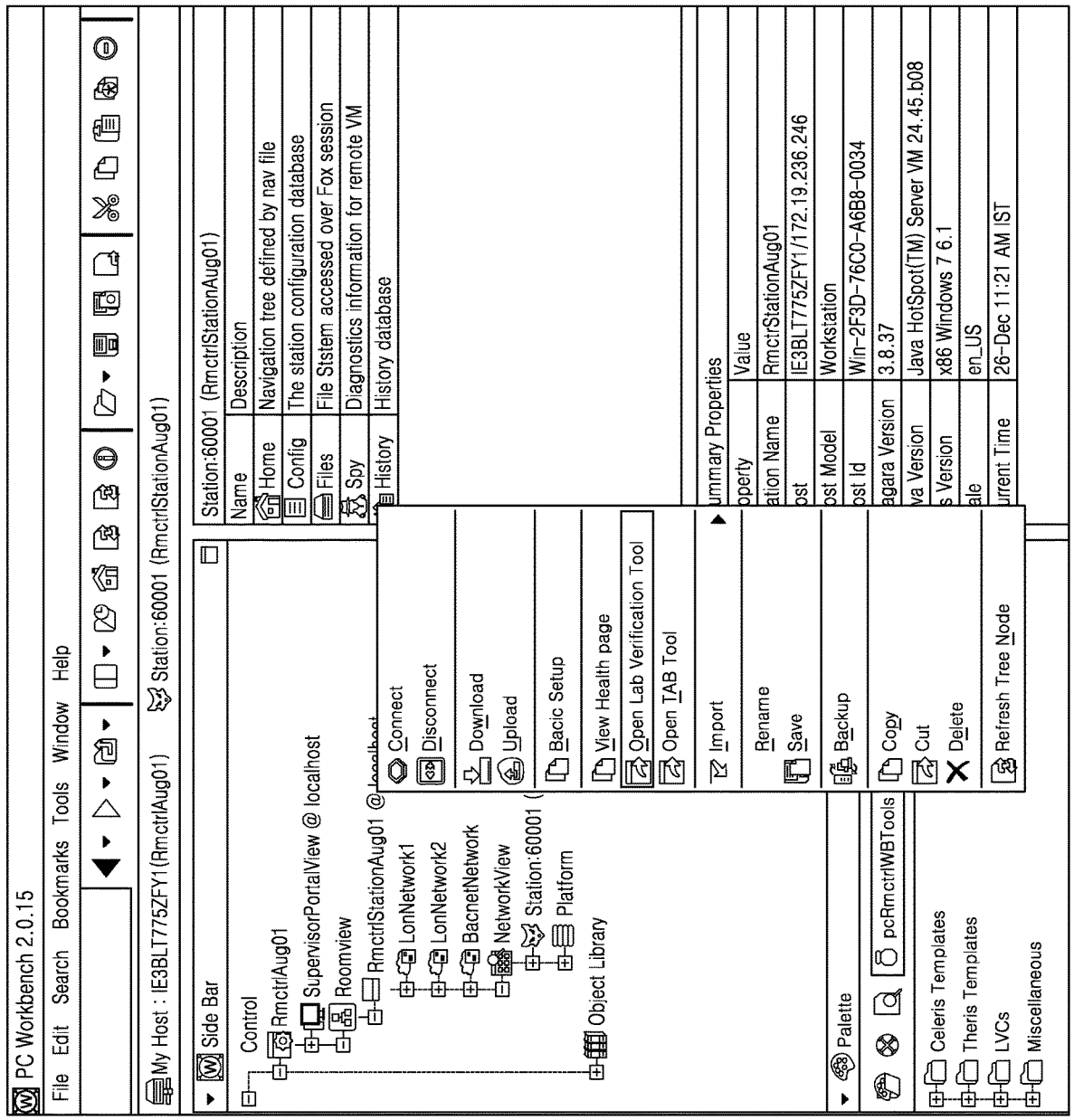
FIG. 3 is a diagram of an example workbench from which one may launch a lab verification mechanism.

The lab verification tool appears to be one of a kind web based tool which may be used by a rep to test and verify if the room and its behavior is working as per the designed conditions. The tool may just require a W3C complaint browser and a room controller built on top of a Niagara Framework™ which controls the functioning of an entity such as a room. An authorized user may launch the tool from the web browser by entering an IP address of the room controller or by alternatively launching the same tool from a Niagara provided work bench. FIG. 3 is a diagram of a screen 41 that reveals the workbench which may be used in a launch of the tool.

A user may launch the LVT from a workbench as illustrated in FIG. 3 or by entering an IP address of the room controller. The entire tool may be based on a wizard tool fashion (but not necessary a full-fledged wizard tool) and may be divided into steps or tabs. The steps or tabs may incorporate a create/open task screen, a select test zone screen, a read flow screen, a hood/booster screen, a T-stat set up screen or temperature lever set up screen, a visual checks screen, and a report screen.

FIG. 4 is a diagram of a create/open task screen 42, which may be a default screen once a user logs into the LVT. The user should be able to create a new task and also edit any existing task on the room controller. In case a task is existing and a new task is created, then the old task should be overridden by the new task. Any one of the mandatory fields may entered before proceeding to the next screen.

Tabs at the top of screen 42 may include a tab 60 for lab verification, a tab 61 for the create/open task, a tab 62 for the select test zone, a tab 63 for the read flows, a tab 64 for the hood booster, a tab 65 for a T-stat set-up, a tab 66 for the visual checks, and a tab 67 for the reports.

In case if a task is completed, a user may traverse or go directly to the reports screen in order to generate the report directly.

FIG. 5 is a diagram of a select test zone screen 43. A user may be able to select the test zone tab by traversing or going to screen 43. The user may traverse or go through various tab screens by clicking on the "Next" and "Previous" buttons, 68 and 69, respectively, or by clicking on the respective tab of tabs 61-67. In select test zone screen 43, the user may see an entire building hierarchy where the user can select only one room. Since LVT may be specific to one room, the user shall not necessarily be able to select more than one room at any point of time. However, at least one room should be selected before traversing on to the next screen. The user may also see virtually all the devices in the selected test zone, as shown in block 71. In addition to device names 72, the user may also see the device online status 73 offline, commissioned, unknown, and so on, and control functions (e.g., zone balance, temperature control, occupancy control and emergency control) as well.

Figure 6:
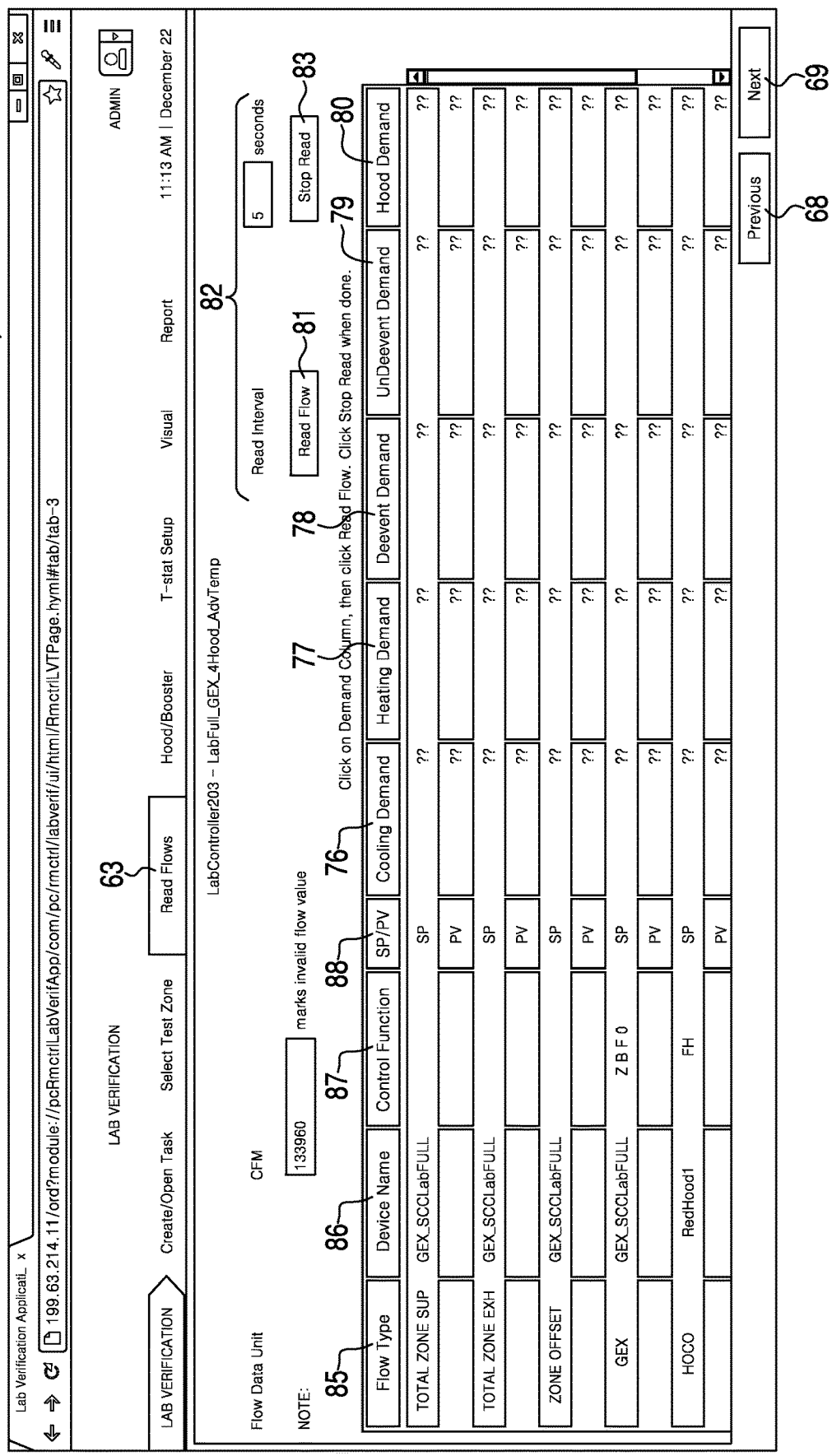
FIG. 6 is a diagram of a read flow layout.

FIG. 6 is a diagram of a read flow screen 44. It may be the main screen where a room can be driven into various conditions and the flow values of the devices can be read. The various conditions in which the room would be driven may incorporate cooling demand, heating demand, occupancy vent demand, unoccupancy vent demand, hood demand, and so forth. In order to read a flow, the user may first select a column by clicking on a column header button, such as cooling demand button 76, heating demand button 77, vent demand button 78, unoccupancy vent demand 79 or hood demand button 80, and then click a "Read Flow" button 81. Columns 85, 86, 87 and 88 may indicate flow type, device name, control function and SP/PV indication, respectively. A "read and update" operation, may repeat itself based on a time set in the read interval field 82. In order to stop a read flow, the user may press a "Stop Read" button 83. The "read interval" text field 82 may display a default time of, for instance, 5 seconds, in order to trigger a subsequent read flow condition following which the device flows would be read again. The read interval 82 may have a limit range of, for example, 2 seconds to 60 seconds, and can be configured by the user. The device flow information may be saved onto the task information only on traversal to the next tab. On traversal to the next tab, the room may be restored back to its original condition.

Figure 7:
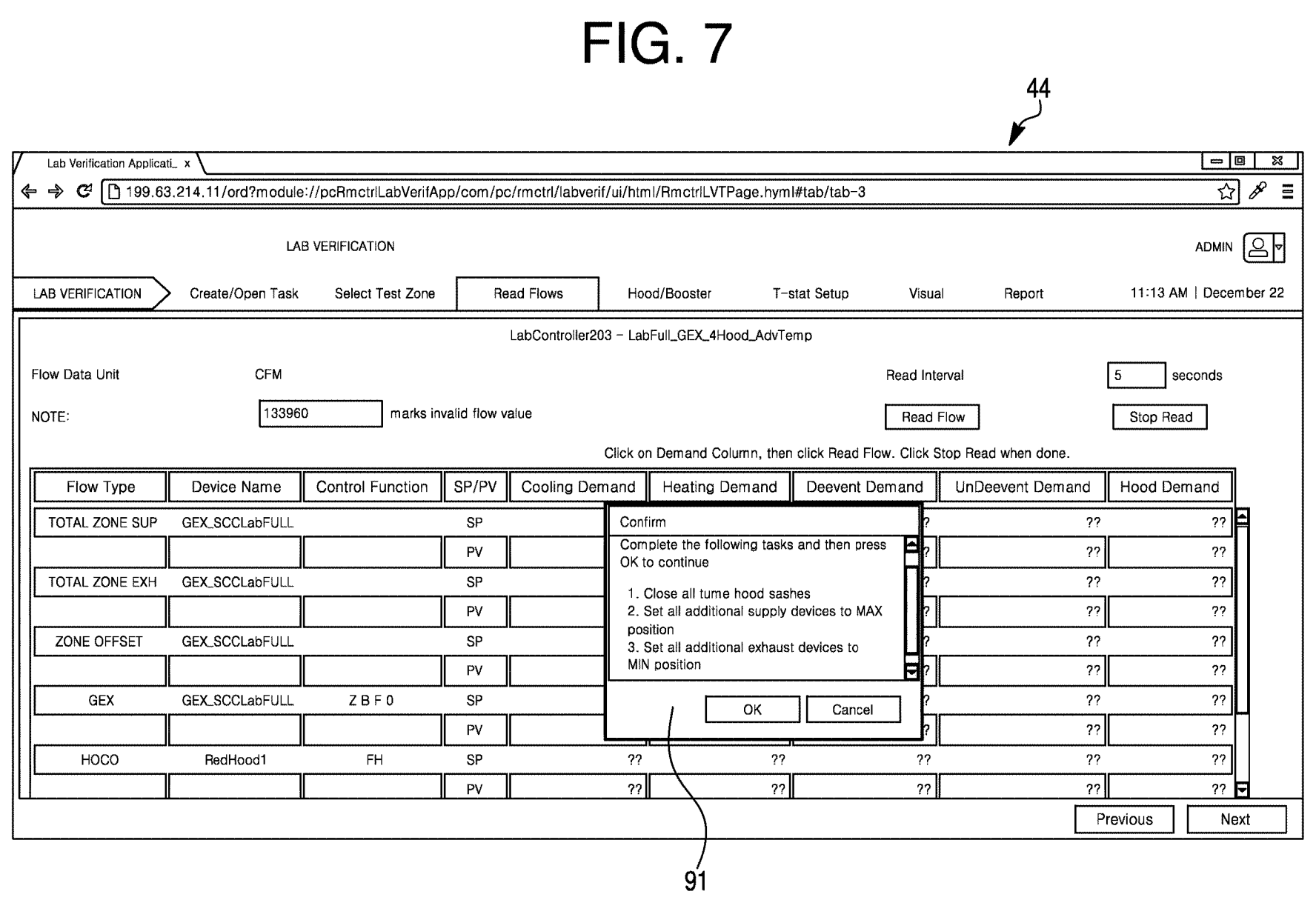

FIG. 7 is a diagram of screen 44 having a "Confirm" dialog box 91 that may state, "Complete the following tasks and then press OK to continue". The tasks may incorporate close all hood sashes, set all additional supply devices to a max position, and set all additional exhaust devices to a min position.

Figure 8:
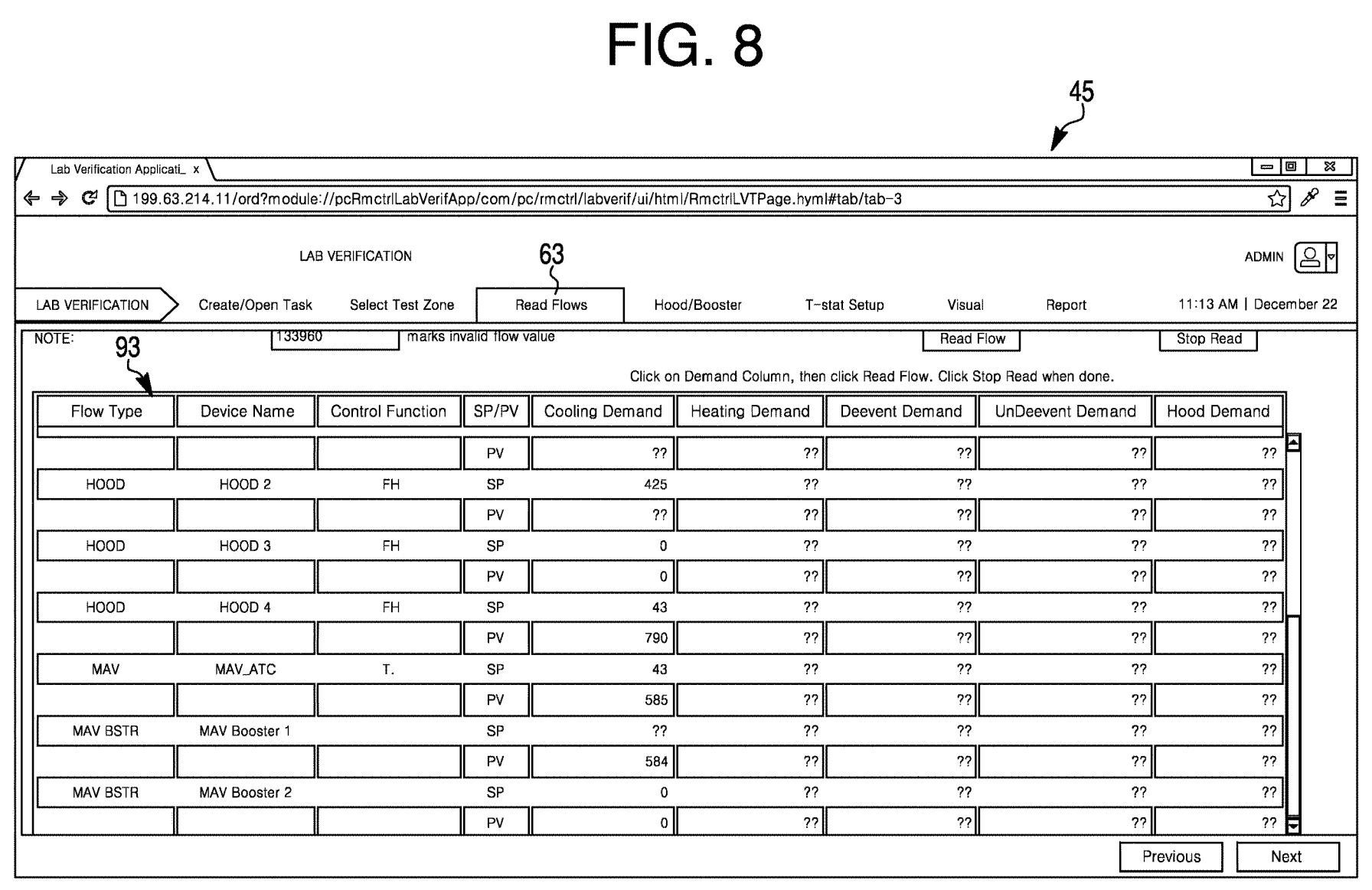

FIG. 8 is a diagram of a hood/booster screen 45. Screen 45 may list the hoods and boosters present inside a selected room along with their respective min and max values in a table 93. Only the min values of a hood should be editable. On moving to another screen 46 the value in a diagram of FIG. 9, information should also be saved as part of the task information, so that the information may be displayed as part of the generated report. Examples of hood and booster minimum and maximum flow values are shown in a table 95. Necessary validations may also be added in order to prevent the user from entering wrong data into the min value fields. A list of validations may incorporate directives such as a user should not be able to enter any characters other than numbers, a user cannot leave the field as empty, and a user cannot enter the minimum value greater than the maximum value for the hood. Screen 46 of a diagram in FIG. 10 may reveal a dialog box 97. An example directive a box 97 may indicate that a hood min value should be less than 661. Other directives may be indicated in box 97. The directive may be confirmed by a user.

FIG. 11 is a diagram of a T-stat setup screen 47 as obtained by pressing tab 65. T-stat setup screen or a temperature set point lever min/max screen 47 may provide a provision for the user to read the set point min and max values of the thermostat (temperature lever). A reading of these values should be done once a user shifts the lever to min and max positions, respectively, and then clicks on a header column 99 of the generated view. The temperature units may be the station preferred units. The user may be prompted to physically move the temperature setpoint lever to a min or max position when "Setpoint Lever Min" or "Setpoint Lever Max" button of header 99 is pressed.

Figure 12:
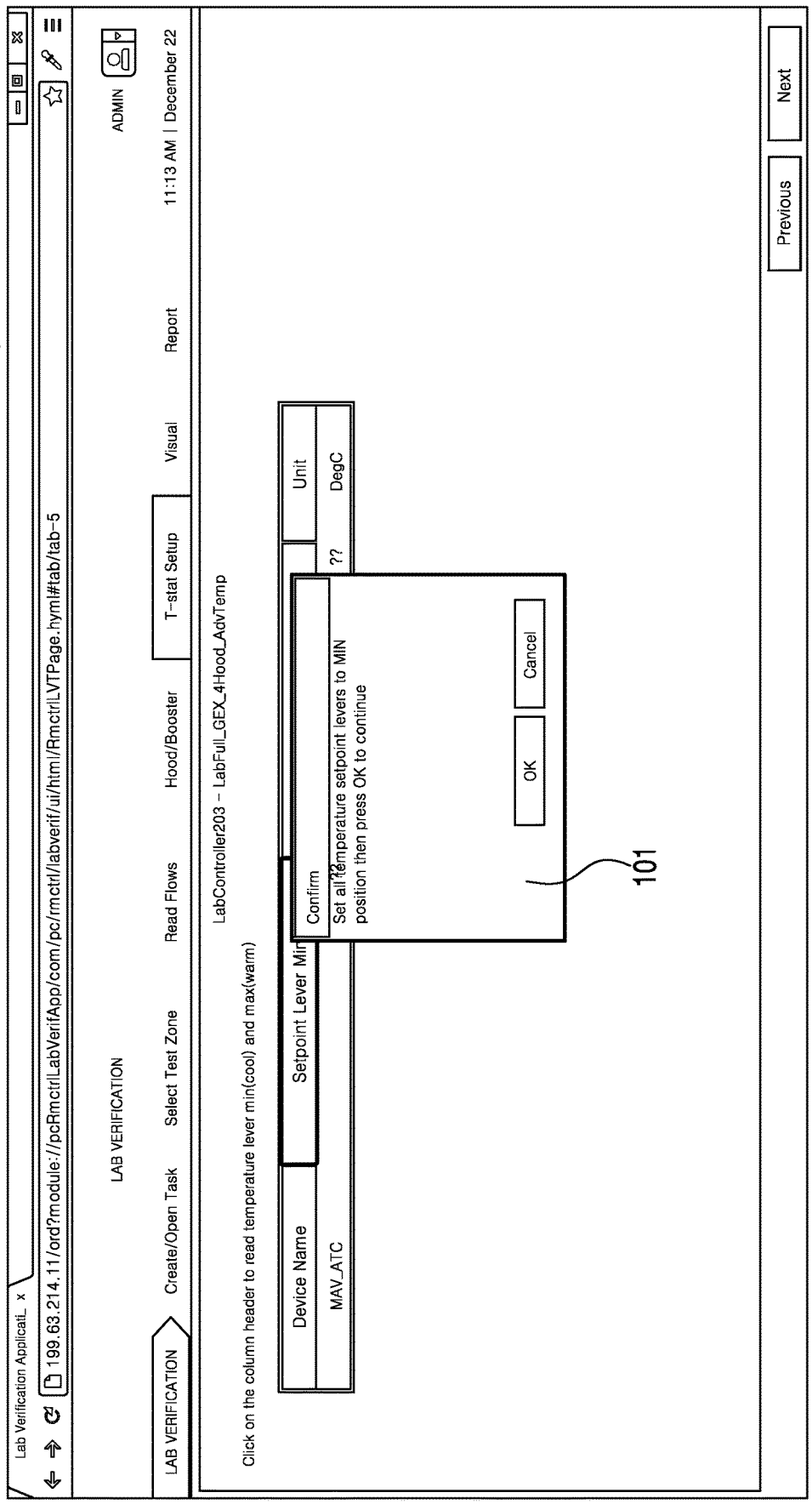
FIG. 12 is a diagram like that of FIG. 11 but with a dialog box that indicates the temperature setpoint levers to be set at a minimum position.

FIG. 12 is a diagram having a dialog box 101 in screen 47. Dialog box 101 may present a directive that states to set all temperature setpoint levers to a min position and then press OK to continue. Box 101 may present other directives. Box 101 may instead be cancelled.

FIG. 13 is a diagram of a visual checks screen 48 obtained with tab 66. Screen 48 may contain a list of visual checks with regard to the various devices present in a room. List 105 may ensure that the user has performed all the necessary checks which are to be performed while configuring the room. Visual screen 66 may be divided into three sections such as general verifications 103, zone configurations 104, and hood visual checks 105.

General verifications 103 may contain a list of general verification checks which should be conducted. Zone related configuration checks may be illustrated in zone configurations section 104. Hood related visual checks may be displayed under hood visual checks section 105.

Figure 15:
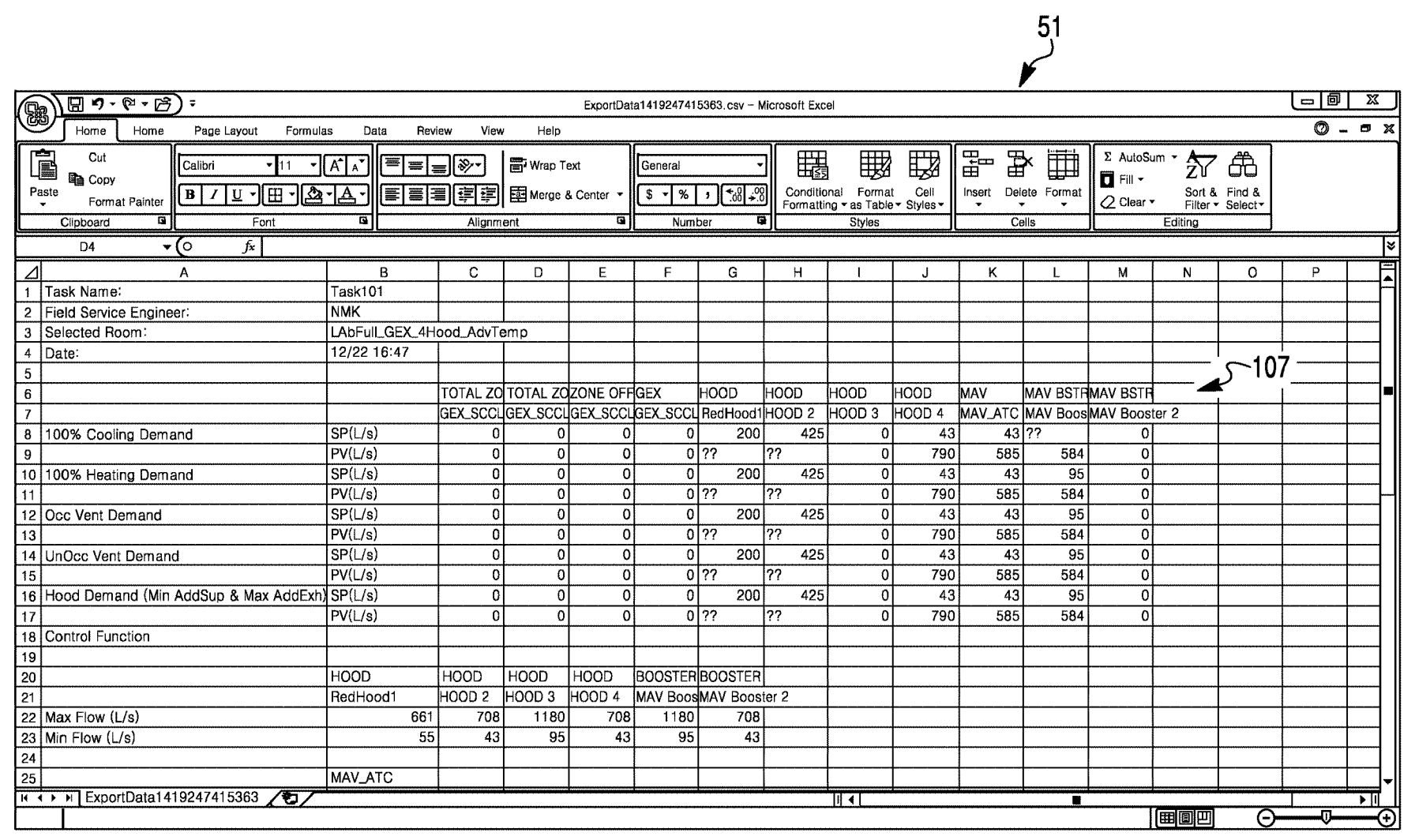

FIG. 14 is a diagram of a report screen 49, as obtained by pressing or clicking tab 67. Entries in blocks or fields 106 may identify a task name, a selected room and notes. Report generation screen 49 should assist a user to generate a report 107 as shown in a screen 51 of FIG. 15 and in a screen 52 of FIG. 16. The generated report 107 may be in a comma separated value (.csv) file. There may also be a provision for the user to enter notes or comments for generated report 107. The user may also export generated report 107 onto a local system by pressing an export button 108 on screen 49. Report 107 may be saved by pressing a save button 109. There may be a button 110 for showing all downloads. FIG. 15 and FIG. 16 are diagrams of screens 51 and 52, respectively, showing example reports 107.

To recap, a system for verification of conditions of a space, may incorporate a controller, a flowing mechanism in the space connected to the controller, one or more devices for measuring flow values in a space, connected to the controller, one or more thermostats connected to the controller, a heating mechanism in the space, connected to the controller, and a cooling mechanism in the space, connected to the controller. The controller may incorporate a user interface. The user interface may incorporate a display and a control mechanism. Current conditions of the space may be verified by the controller to meet preset conditions. The space may be controlled by the controller via the flowing mechanism, the heating mechanism or the cooling mechanism, as selected, in a full heating condition, a full cooling condition, or a full flowing condition, respectively, to achieve the preset conditions. A report of the current conditions may be generated by the controller. The controller may be built on top of a Niagara™ framework.

The display may show a screen selected from a group incorporating a create/open task screen, a select test zone screen, a read flow screen, a hood/booster screen, a thermostat set up screen, a visual checks screen and a report screen. The flowing mechanism incorporates a valve. The space may be a clean room.

The screens may be traversed through sequentially forward or backward, or a specific screen can be selected.

The create/open task screen provides for creating a task or editing an old task. The select test zone screen may show a building hierarchy from which a space can be selected as a test zone, and devices and their status, and control functions can be shown. The read flow screen may show the conditions of the space that can be read in terms of occupancy or unoccupancy, temperatures and flow values.

One or more conditions may be selected from a group incorporating cooling demand, heating demand, occupancy vent demand, unoccupancy vent demand, hood demand and booster demand.

The hood/booster screen may list the hoods and boosters in the space and their respective minimum and maximum operating values that can be edited. The thermostat set up screen may provide a provision for reading the set point minimum and maximum temperature values for the space. The visual checks screen shows sections for general verifications, zone configurations and hood visual checks, respectively, for the space.

One or more general verifications may be selected from a group incorporating reheat valve verification, steam valve verification, occupancy/unoccupancy state verification, bypass state verification, emergency mode verification, and fume hood monitor calibration verification.

Zone configurations for each device of the space may be selected from a group incorporating occupancy minimum vent set points, unoccupancy minimum vent set points, cooling minimum flow values and cooling maximum flow values.

One or more visual checks of hoods for the space may be selected from a group consisting of local flow alarms and emergency exhaust functions.

The report screen may incorporate a task name, a designation of the space, date, notes, information relevant to devices, hoods, boosters, or other items relating to the select test zone screen, read flow screen, hood/booster screen, thermostat set up screen, or visual checks screen.

A report may be generated from the report screen. The report may be exportable to another system.

An approach for verification of conditions of a space, may incorporate connecting an air flow measuring device, a thermostat, an air flow control mechanism, and a temperature changing mechanism to a controller; determining current conditions of a space with the air flow measuring device, the thermostat, the air flow control mechanism, and the temperature changing mechanism; determining preset conditions for the space; controlling current conditions of the space with the controller via the air flow control mechanism, the heating mechanism and the cooling mechanism, as selected, in a full heating condition, a full cooling condition, a full flowing condition, respectively, to achieve the preset conditions; controlling the current conditions to match the preset conditions; and verifying that the current conditions match the preset conditions within a specified percentage.

The controller may incorporate a user interface. The user interface may incorporate a display and a control mechanism. The controller may be built on top of a Niagara™ framework.

The space may be a clean room.

The display may show a screen selected from a group incorporating a create/open task screen, a select test zone screen, a read flow screen, a hood/booster screen, a thermostat set up screen, a visual checks screen, and a report screen.

The screens may be traversed through sequentially forward or backward, or a specific screen may be selected.

The create/open task screen may provide for creating a task or editing an old task. The select test zone screen may show a building hierarchy from which a space can be selected as a test zone, with devices of the zone and their status and control functions. The read flow screen may show the conditions of the space that can be read in terms of temperatures and flow values. The hood/booster screen may list the hoods and boosters in the space and their respective minimum and maximum operating values that can be edited. The thermostat set up screen may provide a provision for reading the setpoint minimum and maximum temperature values for the space. The visual checks screen may show sections for general verifications, zone configurations and hood visual checks, respectively, for the space.

A mechanism for verification of conditions of a space, may incorporate a controller; a fluid mover in a space, connected to the controller; a heat provider to the space, connected to the controller; and a cooler for the space, connected to the controller; and one or more sensors that measure current conditions in the space, connected to the controller.

Preset conditions of the space may be determined and entered in the controller. Current conditions may be adjusted to meet preset conditions by the controller via the fluid mover, the heat provider or the cooler, as selected, in a full heating condition, a full cooling condition, or a full flowing condition, respectively, to achieve the preset conditions. The current conditions may be verified to match the preset conditions with a set percentage by the controller.

The controller may be built on top of a Niagara™ framework.

The preset conditions may incorporate flow rate and temperature of the space. The fluid incorporates air.

The controller may incorporate a display. The display may show a screen selected from a group incorporating a create/open task screen, a select test zone screen, a read flow screen, a hood/booster screen, a thermostat set up screen, a visual checks screen, and a report screen.

The screens may be traversed through sequentially forward or backward, or a specific screen can be selected.

Any publication or patent document noted herein is hereby incorporated by reference to the same extent as if each individual publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A system for verification of conditions of a space, comprising:
   a controller;
   a flowing mechanism in the space connected to the controller;
   one or more flow measuring devices adapted for measuring flow values in a space, connected to the controller;
   one or more thermostats connected to the controller;
   a heating mechanism in the space, connected to the controller; and
   a cooling mechanism in the space, connected to the controller; and
   wherein:
      the controller comprises a user interface;
      the user interface comprises a display and a control mechanism;
      current conditions of the space are verified by the controller to meet preset conditions;
      the space is controlled by the controller via the flowing mechanism, the heating mechanism or the cooling mechanism, as selected, in a full heating condition, a full cooling condition, or a full flowing condition, respectively, to achieve the preset conditions; and
      a report of the current conditions is generated by the controller.

2. The system of claim 1, wherein:
   the display can show a screen selected from a group comprising a create/open task screen, a select test zone screen, a read flow screen, a hood/booster screen, a thermostat set up screen, a visual checks screen and a report screen;
   the flowing mechanism comprises a valve; and
   the space is a clean room.

3. The system of claim 2, wherein the screens can be traversed through sequentially forward or backward, or a specific screen can be selected.

4. The system of claim 2, wherein:
   the create/open task screen provides for creating a task or editing an old task;
   the select test zone screen shows a building hierarchy from which a space is selected as a test zone, and devices and their status, and control functions are shown; and
   the read flow screen shows the conditions of the space that can be read in terms of occupancy or unoccupancy, temperatures and flow values.

5. The system of claim 4, wherein one or more conditions are selected from a group comprising cooling demand, heating demand, occupancy vent demand, unoccupancy vent demand, hood demand and booster demand.

6. The system of claim 2, wherein:
   the hood/booster screen lists the hoods and boosters in the space and their respective minimum and maximum operating values that can be edited;
   the thermostat set up screen provides a provision for reading the set point minimum and maximum temperature values for the space; and
   the visual checks screen shows sections for general verifications, zone configurations and hood visual checks, respectively, for the space.

7. The system of claim 6, wherein one or more general verifications are selected from a group comprising reheat valve verification, steam valve verification, occupancy/unoccupancy state verification, bypass state verification, emergency mode verification, and fume hood monitor calibration verification.

8. The system of claim 6, wherein zone configurations for each device of the space are selected from a group comprising occupancy minimum vent set points, unoccupancy minimum vent set points, cooling minimum flow values and cooling maximum flow values.

9. The system of claim 6, wherein one or more visual checks of hoods for the space are selected from a group consisting of local flow alarms and emergency exhaust functions.

10. The system of claim 2, wherein the report screen comprises a task name, a designation of the space, date, notes, information relevant to devices, hoods, boosters, or other items relating to the select test zone screen, read flow screen, hood/booster screen, thermostat set up screen, or visual checks screen.

11. The system of claim 10, wherein:
    a report is generated from the report screen; and
    the report is exportable to another system.

12. A method for verification of conditions of a space, comprising:
    connecting an air flow measuring device, a thermostat, an air flow control mechanism, and a temperature changing mechanism to a controller;
    determining current conditions of a space with the air flow measuring device, the thermostat, the air flow control mechanism, and the temperature changing mechanism;
    determining preset conditions for the space;
    controlling current conditions of the space with the controller via the air flow control mechanism, the heating mechanism and the cooling mechanism, as selected, in a full heating condition, a full cooling condition, a full flowing condition, respectively, to achieve the preset conditions;
    controlling the current conditions to match the preset conditions; and
    verifying that the current conditions match the preset conditions within a specified percentage; and
    wherein:
       the controller comprises a user interface; and
       the user interface comprises a display and a control mechanism.

13. The method of claim 12, wherein the space is a clean room.

14. The method of claim 12, wherein the display can show a screen selected from a group comprising a create/open task screen, a select test zone screen, a read flow screen, a hood/booster screen, a thermostat set up screen, a visual checks screen, and a report screen.

15. The method of claim 14, wherein the screens can be traversed through sequentially forward or backward, or a specific screen can be selected.

16. The method of claim 14, wherein:

the create/open task screen provides for creating a task or editing an old task;

the select test zone screen shows a building hierarchy from which a space is selected as a test zone, with devices of the zone and their status and control functions;

the read flow screen shows the conditions of the space that can be read in terms of temperatures and flow values;

the hood/booster screen lists the hoods and boosters in the space and their respective minimum and maximum operating values that can be edited;

the thermostat set up screen provides a provision for reading the setpoint minimum and maximum temperature values for the space; and the visual checks screen shows sections for general verifications, zone configurations and hood visual checks, respectively, for the space.

17. A mechanism for verification of conditions of a space, comprising:

a controller;

a fluid mover in a space, connected to the controller;

a heat provider to the space, connected to the controller; and a cooler for the space, connected to the controller; and one or more sensors that measure current conditions in the space, connected to the controller; and wherein:

preset conditions of the space are determined and entered in the controller;

current conditions are adjusted to meet preset conditions by the controller via the fluid mover, the heat provider or the cooler, as selected, in a full heating condition, a full cooling condition, or a full flowing condition, respectively, to achieve the preset conditions; and the current conditions are verified to match the preset conditions with a set percentage by the controller.

18. The mechanism of claim 17, wherein:

the preset conditions comprise flow rate and temperature of the space; and the fluid comprises air.

19. The mechanism of claim 18, wherein:

the controller comprises a display; and the display can show a screen selected from a group comprising a create/open task screen, a select test zone screen, a read flow screen, a hood/booster screen, a thermostat set up screen, a visual checks screen, and a report screen.

20. The mechanism of claim 19, wherein the screens can be traversed through sequentially forward or backward, or a specific screen can be selected.

* * * * *